March 27, 1962 H. L. POTTER 3,026,601
METHOD OF MAKING AND ASSEMBLING A BEARING RETAINER
Original Filed March 7, 1961
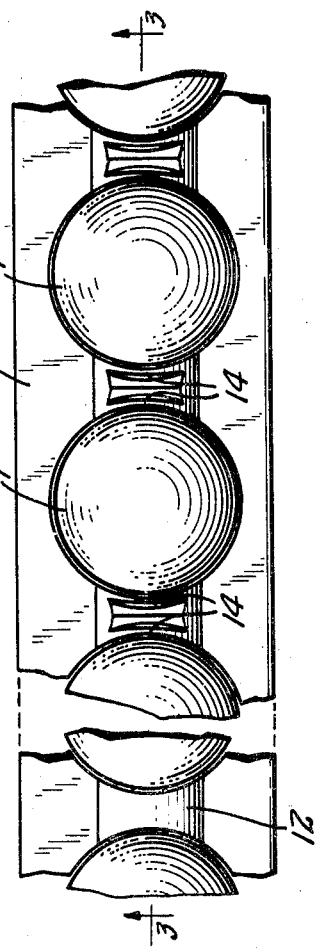
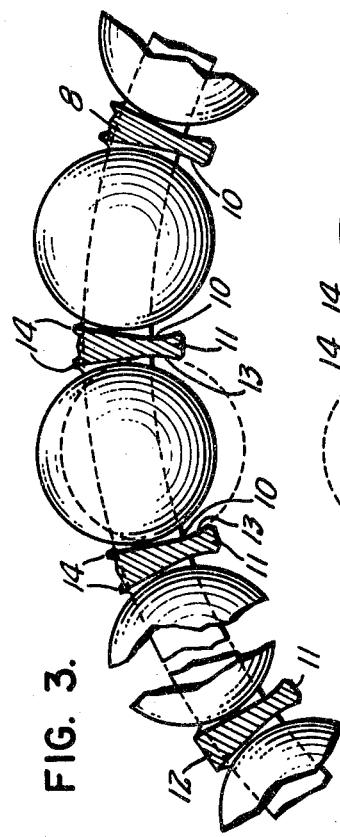
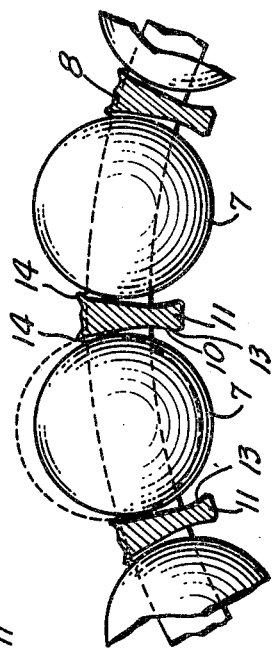
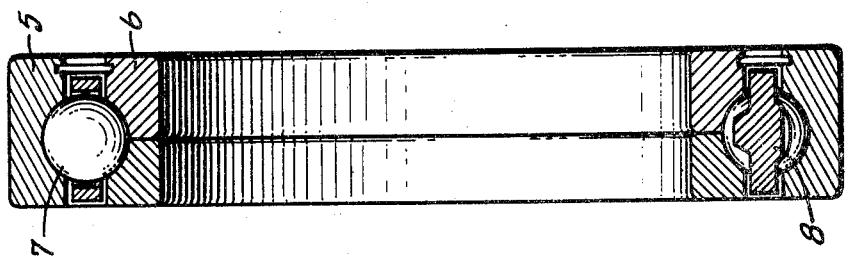
INVENTOR
HOWELL L. POTTER
BY
Roy C. Hopgood
ATTORNEY

United States Patent Office 3,026,601
Patented Mar. 27, 1962

3,026,601
METHOD OF MAKING AND ASSEMBLING A BEARING RETAINER
Howell L. Potter, New Britain, Conn., assignor to The Fafnir Bearing Company, New Britain, Conn., a corporation of Connecticut
Division of application Ser. No. 94,665, Mar. 7, 1961, which is a continuation of abandoned application Ser. No. 746,781, July 7, 1958. This application May 3, 1961, Ser. No. 112,487
4 Claims. (Cl. 29—148.4)

My invention relates to a retainer for a ball bearing, and this is a division of application Serial No. 94,665, filed March 7, 1961, which is a continuation of application Serial No. 746,781, filed July 7, 1958, now abandoned. The retainer of the type herein referred to is cast of suitable material, such as bronze, which has bendable fingers to provide holding means for the balls.

It is an object of the invention to provide an improved method to form a ball retainer.

It is another object to provide a method to form a ball retainer having improved means for holding the balls in the retainer.

Still another object is to provide a method to form a retainer which may be very simply manufactured and which will hold the balls in proper seatings.

Another object is to provide an improved method to form a retainer with retainer fingers which are bendable in pairs by a tool moving either axially or radially of the retainer.

Other objects and various features of novelty and invention will be hereinafter pointed out or will become apparent to those skilled in the art.

Briefly stated the method of the invention provides an annular ring retainer having a plurality of circumferentially spaced holes or pockets for the reception of balls. Between the pockets and extending generally radially inwardly are fingers provided with suitable seats for the balls in the pockets.

At the radially outer sides each hole or pocket has a pair of bendable fingers which are preferably concentric both inside and outside with each other and with the interposed ball pocket. These generally radially outwardly extending ball retaining fingers between adjacent ball pockets present facing convex surfaces which may be engaged by a tool moving either axially or radially of the retainer so as to spread these adjacent ball retaining fingers into ball retaining positions.

The ball pockets when originally formed may be slightly smaller than the diameter of the balls to be received therein. These pockets may then be reamed out with a cherry reamer so as to form generally spherical seats in the inwardly directed fingers or partitions between pockets so that the balls in the pockets rest radially inwardly in generally spherical seats or pockets.

The outer fingers are formed of lugs in the retainer at the radially outer side of the retainer ring and between each pair of pockets. These lugs are cut by a shell or trepanning tool which forms concentric circular or cylindrical surfaces on the retainers at opposite sides of each pocket. The fingers so formed in the spaces between adjacent pockets thus have generally convex facing surfaces. The inner surfaces of these retaining fingers have generally speaking been formed cylindrically or circularly by the cherry reamer or other type of tool doing the finishing of the ball pockets. Thus, when a tool, acting either axially or radially, engages the convex surfaces of the fingers for each ball pocket, the engaged fingers will be moved over the ball pocket so as to hold the ball in place. These curved fingers which are generally concentric on both the inside and outside, when bent over tend to form somewhat spherical surfaces for engagement by the balls. Thus, all of the balls may be held in the retainer.

The invention provides a retainer having several desirable advantages. The fingers described above are bendable readily without danger of deforming the pocket openings, and additionally, a more accurately dimensioned pocket opening is obtained reducing friction and wear. It will be noted still further that less material is embodied in the ring since it must be thinner than prior rings for the oppositely extending lugs to have clearance with the bearing races during use. Therefore, a retainer ring in accordance with the invention is particularly adapted for use in high speed devices, although other uses may readily occur to one skilled in the art.

In the drawings, which show for illustrative purposes only a preferred form of the invention:

FIG. 1 is a diametral sectional view through a ball bearing, showing a retainer embodying the invention;

FIG. 2 is a fragmentary development of a radially viewed section of the retainer;

FIG. 3 is a generally axially viewed fragment of the retainer shown in FIG. 2;

FIG. 4 is a view similar to FIG. 3, but illustrating the radially outwardly directed fingers bent over into ball retaining positions.

In the drawings, the complete ball bearing of FIG. 1 embodies an outer ring 5, an inner ring 6 with interposed balls 7. The balls are held in a retainer 8 embodying the invention. In the particular form shown, the inner ring 6 is formed of two sections held together, as will be understood.

The retainer shown is cast of material such as bronze, and consists of an annular retainer ring 8 having circumferentially equally spaced generally radial ball pockets 10—10. Between adjacecnt pockets and extending inwardly are inwardly directed fingers 11—11 and extending outwardly in a radial direction, the retainer has integral lugs 12 between each pair of pockets. These lugs are preferably cast so as to have the surfaces adjacent the ball pockets substantially concentric with those pockets. The pockets are normally cast of a size smaller than the diameter of the balls to be ultimately received therein, and the pockets are reamed out to proper size before assembly with the balls. In the preferred form of the method of the invention, a cherry reamer, or similar tool, is run axially into each pocket and reams a generally cylindrical shaped pocket of a size to properly receive the balls and the reaming is continued inwardly so as to form spherical surfaces 13 at the inner end. Thus, these spherical surfaces form a generally spherical seat for the ball to prevent them from dropping radially inwardly and to sustain them in proper position in the retainer.

The fingers 14—14 formed of the lugs at the radially outer side of the retainer ring are preferably formed by a shell or trepanning tool which forms the fingers 14—14 at opposite sides of each ball pocket. Since this trepanning tool cuts a circular path, the surfaces of the lugs 14—14 between adjacent ball pockets present convex surfaces facing each other. Thus, each of these radially outer retaining fingers is generally concentric on both its inner and outer surfaces with the ball pocket, such surfaces having been formed by the cherry reamer forming the cylindrical part of the ball pocket and the trepanning tool forming the outer surfaces of the fingers 14.

FIGS. 2 and 3 show the balls generally centered in the retainer and in dotted lines show the balls in their radially innermost positions. In FIGS. 2 and 3 also the radially outer fingers stand up so as to permit entry of the balls radially inwardly into the pockets. The radially outwardly directed fingers 14, as shown in FIGS. 2 and 3, may then be engaged by a tool passing between the adjacent fingers between adjacent ball pockets. Such a tool will engage the facing convex surfaces and bend the fingers 14 over into the ball retaining positions, as shown in FIG. 4. These fingers 14, when bent over into ball retaining positions, tend to form generally spherical seating surfaces for the balls, and thus the latter are held both radially inwardly and outwardly by such generally spherical surfaces.

It will be seen that I have provided an improved form of retainer by the method of the invention wherein the balls are secured in their respective ball pockets and held by generally spherical surfaces. The tools for forming the various parts are all well known and simple in construction.

While the invention has been described in considerable detail and a preferred form illustrated, it is to be understood that various modifications and changes may be made within the scope of the invention, as defined in the appended claims.

I claim:

1. A method of forming an annular ball retainer ring comprising the steps of forming a ring with a plurality of radial holes with a single inwardly extending lug and a single outwardly extending lug formed between adjacent holes and terminating said holes, each hole having a diameter smaller than the diameter of the balls to be received therein, reaming each of said holes to a larger diameter than that of said balls and inwardly a predetermined distance short of the radially inner limit of said inwardly extending lugs to form ball-retaining seats in the inwardly extending lugs, whereby the outwardly extending lugs have generally concentric concave facing surfaces, lugs with a trepanning tool substantially concentrically with the axis of each respective hole to form two opposed separate arcuate bendable fingers for each hole, whereby each of said fingers has a concave inner surface and a convex outer surface both surfaces being substantially concentric about the axis of a hole so that a ball may be held in a ball pocket by separating adjacent fingers and bending them over the ball pockets.

2. A method of forming an annular ball retainer ring comprising the steps of forming a ring with a plurality of radial holes with a single inwardly extending lug and a single outwardly extending lug formed between adjacent holes and terminating said holes, each hole having a diameter smaller than the diameter of the balls to be received therein, finishing each of said holes to a larger diameter than that of said balls and to a radially inward extent short of the radially inner limit of said inwardly extending lugs, said finishing including the forming of generally spherical seats in the inwardly extending lugs so that a ball may be received in each hole and so that the outwardly extending lugs have generally concentric concave facing surfaces, and cutting each of said outwardly extending lugs with a trepanning tool substantially concentrically with the axis of each respective hole to form two opposed separate arcuate bendable fingers for each hole, whereby each of said fingers has a concave inner surface and a convex outer surface both substantially concentric about the axis of a hole so that a ball may be held in a ball pocket by separating adjacent fingers and bending them over the ball pockets.

3. A method of forming an annular ball retainer ring comprising the steps of forming a ring with a predetermined limited thickness and with a plurality of radial holes and with a single inwardly extending lug between adjacent holes and with a single outwardly extending lug between adjacent holes, said lugs terminating said holes, each of said holes having a diameter smaller than a predetermined final dimension; finishing the inner surface of each of said holes to a predetermined larger diameter, and to a radially inward extent short of the radially inner limit of said inwardly extending lugs, to form generally spherical seats in the inwardly extending lugs so that the outwardly extending lugs have generally concentric concave facing surfaces; making a trepanning cut of each of said outwardly extending lugs in an arc substantially concentric with the axis of each respective hole to form two opposed separate bendable fingers for each hole, whereby ball pockets are defined and each of said fingers has a concave inner surface and a convex outer surface both substantially concentric about the axis of a hole; inserting in each pocket a ball of diameter intermediate said larger and smaller diameters; and completing the assembly by separating adjacent fingers and bending them over the ball pockets in retaining relation with the inserted balls.

4. A method of forming an annular ball retainer ring comprising the steps of casting a ring blank with a predetermined limited thickness and with a plurality of holes the axes of which extend radially from the center of the ring and with a single inwardly extending lug between adjacent holes and with a single outwardly extending lug between adjacent holes, said lugs terminating said holes, each of said holes having a cast diameter smaller than a predetermined final dimension; reaming each of said holes concentrically about each of said radially extending hole axes from outside the ring past said outwardly extending lugs and past said ring thickness and into said inwardly extending lugs a predetermined partial distance so that generally spherical ball-retaining seats are formed in each of said holes and so that the outwardly extending lugs have generally concentric concave facing surfaces; making a trepanning cut of each of said outwardly extending lugs in an arc substantially concentric with the axis of each respective hole to form two opposed separate bendable fingers for each hole, whereby ball pockets are defined and each of said fingers has a concave inner surface and a convex outer surface both substantially concentric about the axis of a hole; inserting in each pocket a ball of diameter intermediate said larger and smaller diameters; and completing the assembly by separating adjacent fingers and bending them over the ball pockets in retaining relation with the inserted balls.

References Cited in the file of this patent

UNITED STATES PATENTS

| | | |
|---|---|---|
| 848,776 | Sisson | Apr. 2, 1907 |
| 883,469 | McKeel | May 31, 1908 |
| 1,330,158 | Arnold | Feb. 10, 1920 |
| 1,340,310 | Wolf | May 18, 1920 |
| 1,392,920 | Dane | Oct. 11, 1921 |
| 2,765,518 | Lovell | Oct. 9, 1956 |
| 2,933,803 | Schaeffler | Apr. 26, 1960 |